May 18, 1926.
O. W. HEISE
INDICATING INSTRUMENT
Filed August 26, 1925
1,584,742
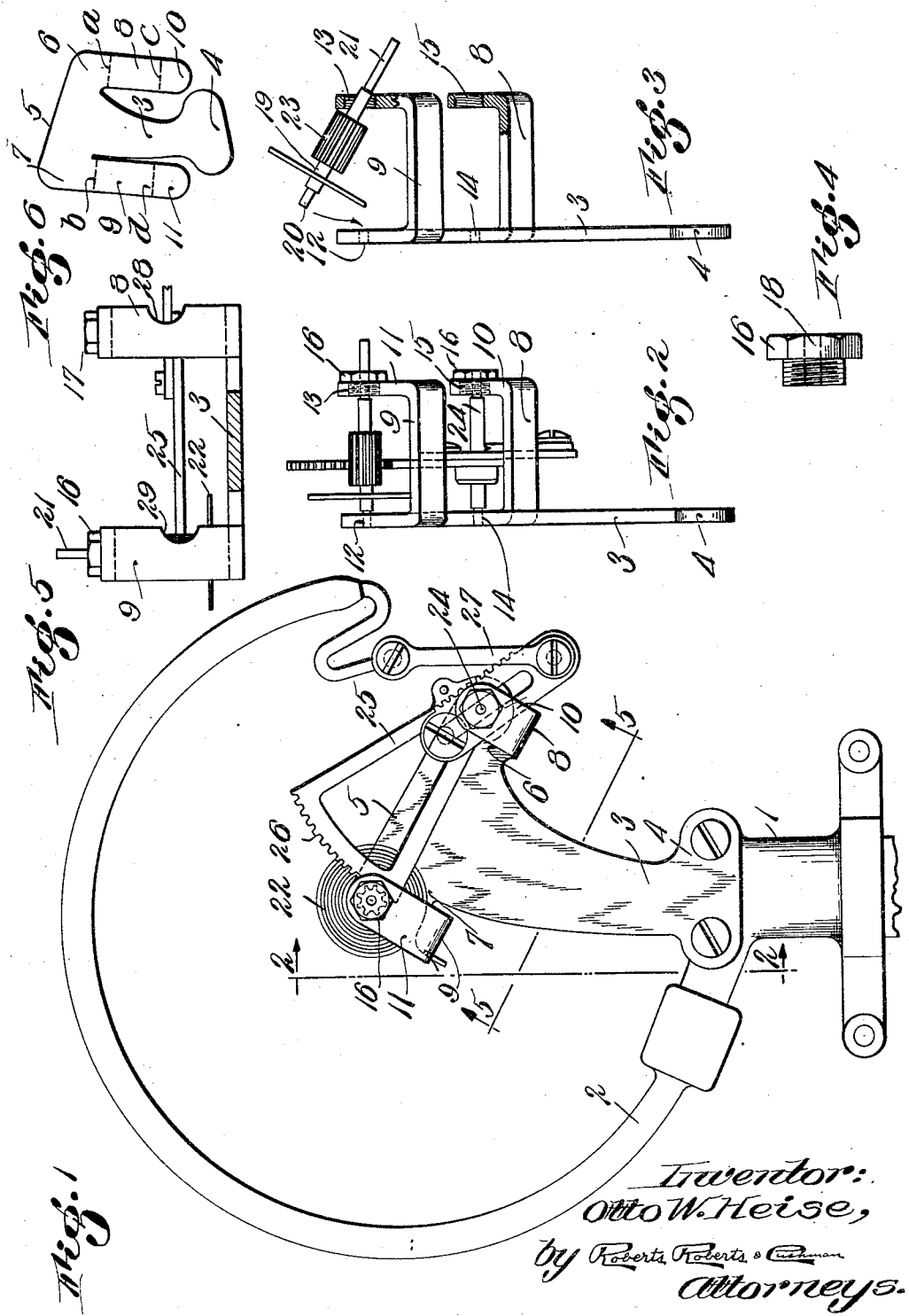
Inventor:
Otto W. Heise,
by Roberts, Roberts & Cushman
Attorneys.

Patented May 18, 1926.

1,584,742

UNITED STATES PATENT OFFICE.

OTTO W. HEISE, OF BRIDGEPORT, CONNECTICUT, ASSIGNOR TO MANNING, MAXWELL & MOORE, INC., OF NEW YORK, N. Y., A CORPORATION OF NEW JERSEY.

INDICATING INSTRUMENT.

Application filed August 26, 1925. Serial No. 52,708.

This invention pertains to indicating instruments such, for example, as pressure or vacuum gauges, and more particularly to the movement supporting frames of such gauges and to a method of making the same.

Gauges for indicating pressure or vacuum, of which the most common type is probably the Bourdon tube gauge, comprise a pressure responsive, resilient element,—the Bourdon tube for example, a movable index or pointer co-operable with a graduated scale, and mechanical devices collectively termed the "movement", for multiplying and transmitting the minute movements of the pressure responsive element to the index. The movement, including the staff or spindle upon which the index is mounted, is usually carried by a frame comprising independent parallel front and rear plates held in rigidly spaced relation by interposed spacer posts threaded at their ends for the reception of screws or nuts. The front and rear plates are provided with bearing openings for the reception of the opposite ends of the index staff, the staff or spindle of the multiplying segment or lever, and such other spindles or staffs as may be necessary to the particular mechanism.

The staffs or spindles usually employed in such devices are reduced in diameter at their opposite ends to form journal portions which are received in aligned bearing openings in the front and rear planes respectively of the frame, and the central unreduced body portion of the shaft is usually of a length substantially equal to the space between the front and rear plates so as to limit endwise movement of the staff when in operative position. Heretofore, it has been thought necessary to make the front and rear plates as independent elements in order to permit the assembly of the parts, but when such independent front and rear plates are assembled, the bearing openings having first been provided, it is found that no matter how exactly the openings in the two plates may have been made, the tightening of the clamping screws or nuts tends to throw the plates out of true parallelism and thus to bring the opposed bearing openings out of proper alignment.

In accordance with the present invention I provide a movement frame of simple and inexpensive type comprising a single integral member constituting both front and back elements of the frame and having bearings of such character as to permit ready insertion or removal of the staffs or spindles while at the same time providing for exact alignment of the front and rear bearing openings.

In the accompanying drawings a preferred embodiment of the invention is illustrated by way of example:—

Fig. 1 being a front elevation showing the improved movement frame as embodied in a Bourdon gauge of usual type;

Fig. 2 is an edge elevation of the movement supporting frame and the parts carried thereby, removed from the gauge and viewed from the position of the line 2—2 of Fig. 1;

Fig. 3 is a view similar to Fig. 2 but illustrating the mode of assembling the parts;

Fig. 4 is an enlarged side elevation of a removable bearing member forming a part of the improved frame;

Fig. 5 is a section on the line 5—5 of Fig. 1; and

Fig. 6 is a plan view, to small scale, of a blank for use in making the frame.

Referring to the drawings, the numeral 1 designates the usual supporting socket for the Bourdon tube 2 and for the movement supporting frame. This frame in the present instance is roughly of T-shape comprising a vertical member 3 having the widened attaching portion 4 at its lower end provided with openings for screws by means of which it is secured to the socket 1. The frame also comprises the cross bar or transverse member 5 having the end portions 6 and 7 respectively.

The frame may conveniently be made from sheet material cut or punched to form a blank of substantially the shape illustrated in Fig. 6. From the lower edges of the opposite ends 6 and 7 of the cross bar 5 tongues 8 and 9 project, such tongues being formed integrally with the cross bar 5 as indicated in Fig. 6. These tongues 8 and 9 are then bent along the lines $a$ and $b$ respectively to form posts disposed substantially at right angles to the plane of the frame proper. The end portions of these posts are then again bent along the lines c and d to form brackets 10 and 11 which overhang the end portions 6 and 7 respectively of the frame and which are disposed in parallel relation thereto and spaced therefrom.

After the frame has been bent into its final shape as just described, aligned openings 12 and 13 are formed in any suitable way in the end portion 7 of the frame proper and in the bracket 11 respectively, and a similar pair of aligned openings 14 and 15 is formed in the parts 6 and 10 respectively. One opening of each pair, preferably the openings in the brackets 10 and 11, is of greater diameter than the other opening of said pair and is adapted to receive a bearing plug 16. The openings which receive these plugs are of a diameter at least as great as the diameter of the main or body portion of the corresponding staff or spindle, while the opposite openings, for example the openings 12 and 14 are of proper diameter to form bearings for the reduced end portions of the staffs.

Preferably the larger openings 13 and 15 are internally screw threaded and the corresponding plugs 16 are screw threaded for engagement therewith, the plugs having angular heads to receive a suitable wrench. Each of the plugs 16 is provided with an axial bearing opening and when the plugs are seated in their sockets 13 and 15 the openings in the plugs align with the corresponding openings in the frame proper.

As here shown, the opening 12 and the opening 18 in the corresponding plug 16 are adapted respectively to receive the journal portions 20 and 21 of an index staff 19. This staff carries the usual hair spring 22 and the pinion 23. The opening 14 and the opening in the opposed plug 16 are adapted respectively to receive the opposite journal portions of a staff or spindle 24 which carries the usual segment lever 25 comprising the segment gear 26 meshing with the pinion 23 and which is connected at its opposite end by means of a link 27 to the tube 2. In order to provide for the proper swing of the segment lever the posts 8 and 9 are preferably provided with recesses 28 and 29 in their edges.

After the frame has been completed as above described the staffs 19 and 24 may be placed in operative position by removing the plugs 16 and inserting the staffs in an angular direction as indicated in Fig. 3 through the larger of the openings. The staffs are then swung down until the journal portion at one end may be inserted in the proper bearing opening in the main part of the frame. The corresponding bearing plug 16 is then slipped over the opposite journal portion of its staff and engaged with the threaded opening in the corresponding bracket.

Since the openings in the frame are formed after the latter is bent and since it is unnecessary to apply any pressure to the frame in assembling the parts such as might spring the front and rear members of the frame out of true parallelism, the bearing openings remain accurately in alignment while at the same time assembly of the parts is greatly facilitated, no especial skill or care being necessary.

I claim:

1. A movement frame for gauges comprising a piece of sheet material forming a base, a tongue integrally united to the base and outstanding substantially at right angles to the plane of the base, said tongue being bent intermediate its ends to provide a bracket member which overhangs and is substantially parallel to the base member, but spaced from the latter, the base member having a journal opening and the bracket member having an opening aligned with said journal opening, and a removable bearing member in the opening in the bracket member, said bearing member having a journal opening aligned with the journal opening in the base member.

2. A movement frame for gauges comprising a base plate having an integral post projecting from one side thereof, the post having an overhanging bracket which extends substantially parallel to the main part of the base plate, the base plate having a bearing opening therein adapted to receive one end of a staff, the overhanging bracket having an opening coaxial with said bearing opening but of larger diameter and internally screw threaded, and a screw threaded plug engaging said screw threaded opening, the plug having an axial bearing opening for the other end of said staff.

3. A movement frame for gauges comprising a piece of sheet metal forming a base, a pair of spaced tongues projecting from the edge of the base, said tongues extending from their junction with the base substantially at right angles to the plane of the latter, the end portions of the tongues being bent at right angles to overhang and to lie parallel to the plane of the base, each tongue having an opening therethrough, and a removable plug seated in each of said openings, each plug having a central bearing opening, the base having bearing openings coaxial with the bearing openings in the respective plugs.

4. A movement frame for gauges comprising a substantially T-shaped base, a post integrally united to the base at the lower edge of each end of the transverse member of the base, each post having an integral end portion parallel to the plane of the base and overhanging the corresponding end portions of the transverse member of the base, aligned bearings in one end of the transverse member of the base and in the overhanging end of the corresponding post respectively for the ends of an index staff, aligned bearings in the other end of the transverse member of the base and in the overhanging end of the other post, respectively for the ends of a segment staff, the bearings for one end of each staff being formed in a removable part.

Signed by me at Bridgeport, Connecticut, this 24 day of Aug. 1925.

OTTO W. HEISE.